United States Patent [19]

Cole

[11] 4,394,613

[45] Jul. 19, 1983

[54] FULL-CHARGE INDICATOR FOR BATTERY CHARGERS

[75] Inventor: Steven W. Cole, Covina, Calif.

[73] Assignee: California Institute of Technology, Pasadena, Calif.

[21] Appl. No.: 225,961

[22] Filed: Jan. 19, 1981

[51] Int. Cl.³ .................... H02J 7/10; G01R 19/165
[52] U.S. Cl. .................... 320/48; 323/278; 323/902; 340/636
[58] Field of Search ................. 320/22, 32, 39, 43, 320/48; 323/278, 902; 340/636

[56] References Cited

U.S. PATENT DOCUMENTS

| | | | |
|---|---|---|---|
| 3,336,519 | 8/1967 | Grimm | 320/48 |
| 3,517,295 | 6/1970 | Lapuyade | 320/39 X |
| 3,553,561 | 1/1971 | Lesher | 320/48 |
| 3,611,017 | 10/1971 | Freeland | 323/902 |
| 3,863,130 | 1/1975 | Yamaoka et al. | 320/48 X |
| 3,909,702 | 9/1975 | Hart | 323/902 |
| 3,930,198 | 12/1975 | Williamson | 340/636 X |
| 4,056,765 | 11/1977 | Scheidler et al. | 320/48 |
| 4,243,929 | 1/1981 | Lenart | 320/39 X |

OTHER PUBLICATIONS

Owen, "Battery State Indicator", Practical Electronics, vol. 14, No. 5, Nov. 1978, p. 8, S90380037.

Primary Examiner—A. D. Pellinen
Attorney, Agent, or Firm—Freilich, Hornbaker, Wasserman, Rosen & Fernandez

[57] ABSTRACT

A full-charge indicator for battery chargers, includes a transistor which is in a conductive state as long as charging current to the battery is not less than a level which indicates that the battery did not reach full charge. When the battery reaches full charge, a voltage drop in a resistor in the charging current path is not sufficient to maintain the transistor in a conducting state, and therefore it is switched off. When this occurs an LED is turned on, to indicate a full charge state of the battery. A photocoupler together with a photocoupler transistor are included. When the transistor is off, the photocoupler activates the photocoupler transistor to shunt out a resistor, thereby reducing the charging current to the battery to a float charging current and prevent the battery from being overcharged and damaged.

8 Claims, 1 Drawing Figure

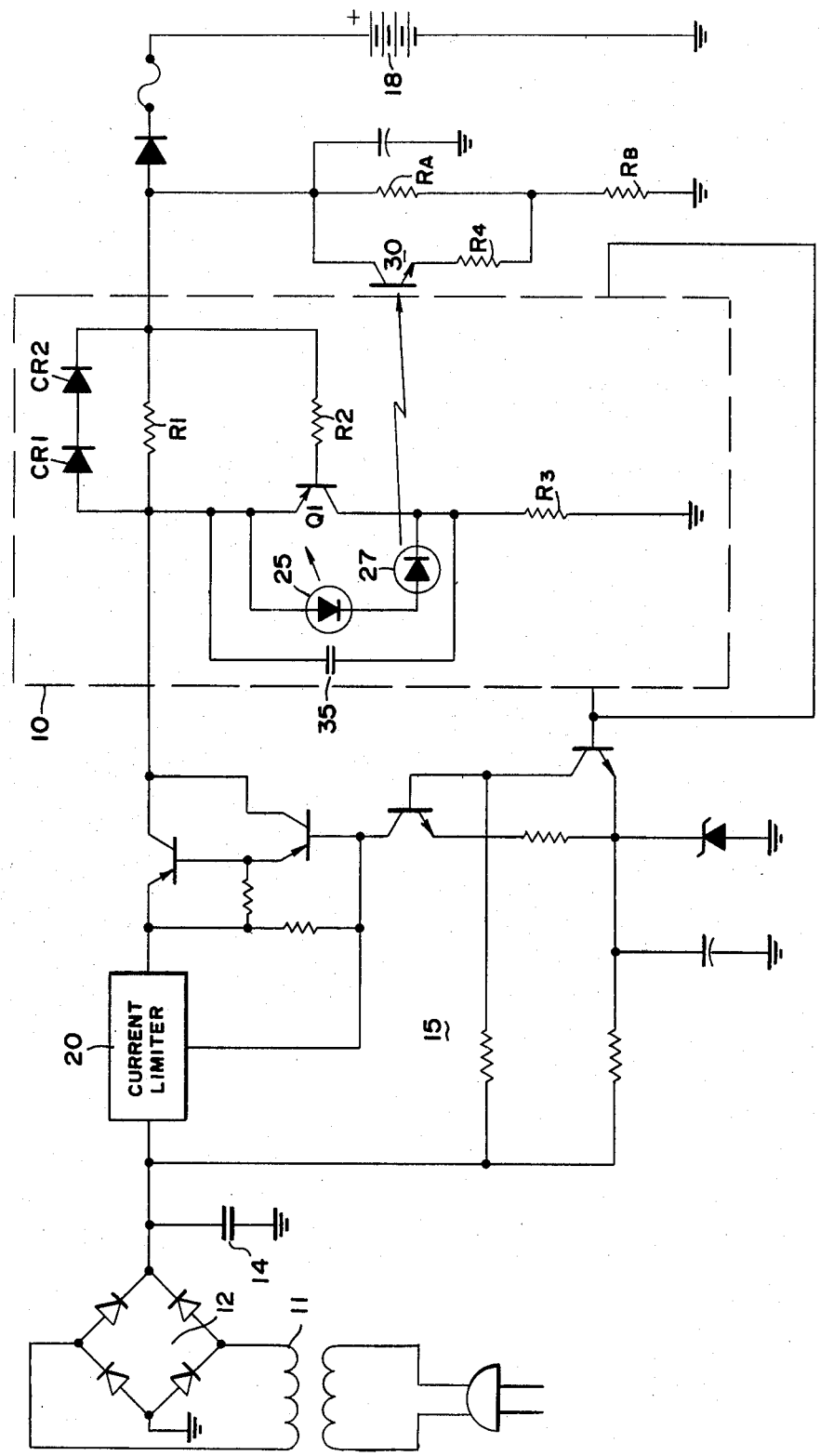

FULL-CHARGE INDICATOR FOR BATTERY CHARGERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

BACKGROUND OF THE INVENTION

1. Field of the Invention

The present invention generally relates to battery charging circuitry and, more particularly, to a full-charge indicator for battery chargers.

2. Description of the Prior Art

In the charging of most types of batteries, and particularly of the NiCd or lead acid types, it is very desirable to be able to know when the battery under charge has reached a full-charge state. Also, when battery charging is left unattended, it is important to provide some arrangement to prevent battery overcharged in order not to damage the battery. Some batteries tend to explode when being overcharged.

A need exists for a simple circuit to provide an indication when the battery is fully charged, and protection against battery overcharging while maintaining it in a fully charged state.

SUMMARY OF THE INVENTION

In accordance with the present invention, a circuit, for inclusion in a battery charger, comprises a resistor which is designed to sense the charging current. As long as the charging current through the resistor is greater than a known level, thereby indicating that the battery is not yet fully charged, the voltage across the resistor exceeds a chosen voltage. As a result, a transistor, connected in parallel with an indicator e.g. an LED, is turned on. Thus, the LED is not energized. However, once the battery reaches full charge and, as a result the charging current drops below the known level, the transistor is cut off and the LED is illuminated, thereby indicating a full-charge state of the battery.

To protect the battery from becoming overcharged, a photocoupler, a resistor and a photocoupler transistor are added. The photocoupler is connected in series with the LED. Thus it is turned on or illuminated whenever the LED is illuminated which occurs when the battery reaches full charge. Once illumminated, the photocoupler activates the photocoupler transistor which causes the charger's output voltage to decrease to a float level and thereby protect the battery from becoming overcharged.

The novel features that are considered characteristic of this invention are set forth with particularity in the appended claims. The invention will best be understood from the following description when read in connection with the accompanying drawing.

BRIEF DESCRIPTION OF THE DRAWING

The FIGURE is a schematic diagram of a battery charger incorporating the circuitry of the present invention.

DETAILED DESCRIPTION OF THE INVENTION

Attention is now directed to the single FIGURE which is a schematic diagram of a battery charger that incorporates the circuitry of the invention, which is represented by the circuitry surrounded by dashed line 10. Except for this circuitry, the rest of the diagrammed circuitry represents a conventional charger with its power transformer 11, rectifying bridge 12, a filter circuit, represented by capacitor 14, and control circuitry 15. The latter includes a voltage divider network represented by $R_A$ and $R_B$. Preferably, to protect a battery, such as battery 18, from excessive charging current, a current limiter is included to limit the maximum current which may be supplied to battery 18. The current limiter is designated in the FIGURE by 20.

As shown in the FIGURE, the novel circuitry includes a resistor R1 which is in the charging current path. The emitter of a PNP silicon transistor Q1 is connected to one end of R1 and the transistor base, through a resistor R2, is connected to the other end of R1. The collector of Q1 is connected to ground through a third resistor R3. A light emitting diode or LED 25, together with a photocoupler 27, are connected in series across the emitter-collector circuit of transistor Q1. For explaining the first aspect of the invention, the photocoupler may be ignored.

As should be apparent when transistor Q1 is conducting, or is on, insufficient current flows through LED 25 and therefore it does not emit light. On the other hand when transistor Q1 is off i.e. is non-conducting, sufficient current flows through LED 25 thereby activating it, to emit light. To switch transistor Q1 on a known emitter to base voltage difference must be present. It is typically 0.6 volt.

In practice the resistance of R1 is chosen so that as long as the charging current is not less than a given level, which indicates that the battery did not reach a full charge state as yet, the voltage drop across R1 is not less than 0.6 volt and therefore transistor Q1 conducts. For example, assuming that when battery 18 is fully charged, the charging current drops below 50 ma, the resistance of R1 is chosen to be 12 ohms. Thus, as long as the current is 50 ma or above the voltage across R1 is not less than 0.6 v and therefore transistor Q1 conducts. The function of R2 is to limit the base current. As shown, two diodes CR1 and CR2 are connected across R1 to limit the voltage drop across it not to exceed 1.5 v, by providing a current path around R1.

When transistor Q1 conducts LED 25 is not energized sufficiently to emit light. However, as soon as the battery reaches a full charge state, the charging current drops below 50 ma. Therefore the voltage drop across R1 is less than 0.6 v. Consequently, Q1 is cut off. With Q1 in a non-conducting state, sufficient current flows through LED 25 and therefore it emits light, which indicates that the battery is fully charged.

Quite often chargers are left unattended, in which event a danger exists that the battery may be overcharged, which may greatly damage or destroy the battery. To prevent overcharging from occuring, the photocoupler 27 together with additional circuitry are included. The additional circuitry consists of a photocoupler transistor 30, which turns on when the photocoupler 27 emits light, and a resistor R4. The transistor 30 and the resistor R4 are connected in series across $R_4$ which is in the charger's voltage dividing branch.

In operation, as the battery becomes fully charged and the charging current drops below 50 ma, Q1 cuts off. Therefore, in addition LED 25, photocoupler 27 emits light. The light from photocoupler turns on photocoupler transistor 30 and thus R4 is effectively across $R_A$, thereby reducing the effective resistance of $R_A$ in the voltage divider network. Consequently, the voltage across the battery decreases. R4 is chosen so that the voltage drops to a safe floating voltage level, and only a float charging current is applied to the battery. The floating voltage is chosen so that the battery is protected from becoming overcharged. The floating voltage level is generally specified by the battery manufacturer.

As seen from the FIGURE, a capacitor 35 is connected across LED 25 and the photocoupler 27. The function of capacitor 35 may be described as follows: When the charger is first turned on to charge a battery, which is other than fully charged, a finite time elapses before the charge current builds up to the required charging level. Without the capacitor 35, as the charger is turned on, the charging current may be less than 50 ma, thus turning on photocoupler 27 which would in turn, turn on transistor 30, thereby locking the charging voltage at the float voltage level, unless the battery is discharged so that the charge current exceeds 50 ma even at the floating voltage level. However, with the capacitor 35, it delays the activation of photocoupler by a short period which is sufficient for the charger's charging current to build up to 50 ma or more, thereby preventing the charger from becoming locked at the float voltage, except when the battery is fully charged.

In summary, in accordance with the present invention, the state of charge of the battery, being charged, is monitored by sensing the charging current, which flows to the battery, rather than the voltage across the battery. Only when the charging current falls below a certain level, thereby indicating that the battery is fully charged is an indicator e.g. an LED energized to indicate full charge battery state. To prevent a battery from being overcharged, means are included, so that when the battery reaches full charge the charger is controlled to reduce the voltage across the battery to a float level and apply to the battery a current, which can be applied to the fully charged battery without any danger thereto.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A circuit for use in a battery charger to indicate when the battery to be charged reaches a full charge state and for protecting said battery from being overcharged, comprising
    a control means in the charging current path for providing less than a preselected voltage drop thereacross when the charging current is less than a known level, which is indicative of a full-charge battery state,
    a transistor connected with its base-emitter junction across said control means, said transistor being switchable to a nonconducting state only when the voltage across said control means is less than said preselected voltage,
    an indicator connected between the collector and emitter of said transistor, whereby, when said transistor is in a nonconducting state, said indicator is energized,
    unidirectional conducting means in series with said battery through which charging current is supplied,
    a voltage dividing network comprising at least first and second series resistors connected between a conductor along which current is conducted into said battery and a source of reference potential for said battery,
    switching means for reducing the effective resistance of one of said voltage dividing resistors when the voltage drop across said control means is less than said preselected voltage to reduce the charging voltage applied to said battery, said switching means comprising a photocoupler and a photocoupler transistor, the former being connected in series with said indicator between the emitter and collector of said transistor, and the later being connected across one of said voltage dividing resistors.

2. A circuit as defined in claim 1 further including a capacitor connected across said photocoupler and light indicator.

3. A circuit as defined in claim 2 wherein said indicator is a light source.

4. A circuit as defined in claim 2 wherein said light source is a light emitting diode.

5. In a battery charger, a circuit for protecting the battery from being overcharged, comprising
    control means in the charging current path for providing less than a preselected voltage drop thereacross when the charging current level is less than a known level which is related to full-charge battery state,
    a resistive network connected between a conductor along which current is conducted into said battery and a source of reference potential for said battery,
    a transistor switch having its base-emitter junction connected across said control means to switch from one conduction state to a second state when the voltage drop across said control means is less than said preselected voltage drop, and
    switching means for reducing the resistance provided by said network when the voltage across said control means is less than said preselected voltage drop, said switching means comprising a photocoupler responsive to said transistor switch to emit light when said transistor switch is switched to said second state and a photocoupler transistor connected in parallel with a portion of said resistive network,
    whereby light from said photocoupler activates said photocoupler transistor to reduce the resistance provided by said network.

6. A circuit as defined in claim 5 further including a light indicator connected in series with said photocoupler, whereby when said transistor switch is in its second state to activate said photocoupler to emit light, said light indicator is energized to indicate said full battery charge state.

7. A circuit as recited in claim 6 wherein said light indicator is a light emitting diode.

8. A circuit as recited in claim 5 wherein said resistance network comprises a plurality of resistors connected in series, and said control means includes a separate resistor connected in series with said photocoupler transistor, and said photocoupler transistor and separate resistor are connected across at least one of the resistors of said network.

* * * * *

UNITED STATES PATENT AND TRADEMARK OFFICE
CERTIFICATE OF CORRECTION

PATENT NO. : 4,394,613

DATED : July 19, 1983

INVENTOR(S) : Steven W. Cole

It is certified that error appears in the above-identified patent and that said Letters Patent are hereby corrected as shown below:

Col. 4, line 25, delete "2" and substitute -- 3 --

Signed and Sealed this

Tenth Day of January 1984

[SEAL]

Attest:

GERALD J. MOSSINGHOFF

Attesting Officer

Commissioner of Patents and Trademarks